March 10, 1970 J. S. P. ROBERTON ET AL 3,500,393

BALANCED ARMATURE MAGNETIC PERCUSSION SOUNDING DEVICE

Filed Oct. 21, 1965 8 Sheets-Sheet 1

March 10, 1970 J. S. P. ROBERTON ET AL 3,500,393

BALANCED ARMATURE MAGNETIC PERCUSSION SOUNDING DEVICE

Filed Oct. 21, 1965 8 Sheets-Sheet 2

March 10, 1970 J. S. P. ROBERTON ET AL 3,500,393

BALANCED ARMATURE MAGNETIC PERCUSSION SOUNDING DEVICE

Filed Oct. 21, 1965 8 Sheets-Sheet 4

BALANCED ARMATURE MAGNETIC PERCUSSION SOUNDING DEVICE

Filed Oct. 21, 1965 8 Sheets-Sheet 3

March 10, 1970 J. S. P. ROBERTON ET AL 3,500,393

BALANCED ARMATURE MAGNETIC PERCUSSION SOUNDING DEVICE

Filed Oct. 21, 1965 8 Sheets-Sheet 6

United States Patent Office 3,500,393
Patented Mar. 10, 1970

3,500,393
BALANCED ARMATURE MAGNETIC PERCUSSION SOUNDING DEVICE

James Samuel Paterson Roberton, Leslie Eugene Basil Dymoke-Bradshaw, and Nirmal Singh Lotay, London, England, assignors to International Standard Electric Corporation, New York, N.Y., a corporation of Delaware Filed Oct. 21, 1965, Ser. No. 499,357
Int. Cl. G08b *3/00*
U.S. Cl. 340—392 20 Claims

ABSTRACT OF THE DISCLOSURE

A rockable armature type telephone ringer. The armature has a centrally disposed pivotal axis. The armature is pivotally held to a support by a unique spring arrangement. The spring is shaped to hold the armature and support firmly together to thereby ensure good pivotal action even after wear occurs at the pivot points.

This invention relates to pivoted armature magnetic devices, particularly polarised magnetic devices, and more particularly to ringers as used in telephone subscriber's instruments.

According to the invention there is provided a pivoted armature magnetic device, in which the pivotal axis is perpendicular to the general direction of magnetic fluxes in the armature and is between the armature and a support, and in which the armature is held to the support by means of a spring, ends of the spring being held to the armature (or the support) and a portion of the spring intermediate these ends being bowed towards and held to the support (or the armature respectively), so that the tension in the spring due to bowing holds the armature and the support firmly together.

According to the invention there is also provided a polarised magnetic ringer which includes a magnetisable core surrounded by an energising coil, end portions of the core projecting out of the coil, and an armature substantially parallel to the core and rockable about a pivotal axis, in which the pivotal axis is perpendicular to the general direction of magnetic fluxes in the armature and is between the armature and a support, in which the armature is held to the support by a spring, ends of which spring are held to the armature (or the support) and a portion of the spring intermediate these ends is bowed towards and held to the support (or the armature respectively), so that the tension in the spring due to bowing holds the armature and the support firmly together, in which end portions of the armature co-operate with end portions of the core, in which magnetic means give the ends of the core the same magnetic polarity, so that energisation of the coil with alternating current causes the armature to rock about the pivotal axis, and in which a hammer is carried by the armature and cooperates with at least one gong adjacent to the head of the hammer.

According to the invention there is also provided a polarised magnetic device, which includes a spool made of a resilient plastics material and carrying a coil which when in use is energised by an alternating current, a magnetisable core contained in an axial hole through the spool and having portions projecting out of the coil, a permanent magnet arranged to give the ends of the core the same polarity, the permanent magnet having its magnetic axis perpendicular to the axis of the coil and being held by its ends fitting in two extensions of the spool cheeks outside the winding of the coil, and an armature substantially parallel to the core, the armature having ends which co-operate with the ends of the core and being rockable about a pivotal axis intermediate its ends upon energisation of the coil.

Embodiments of the invention, as applied to a polarised magnetic ringer for a telephone instrument, will now be described, by way of example, with reference to the accompanying drawings, in which.

Figure 1:
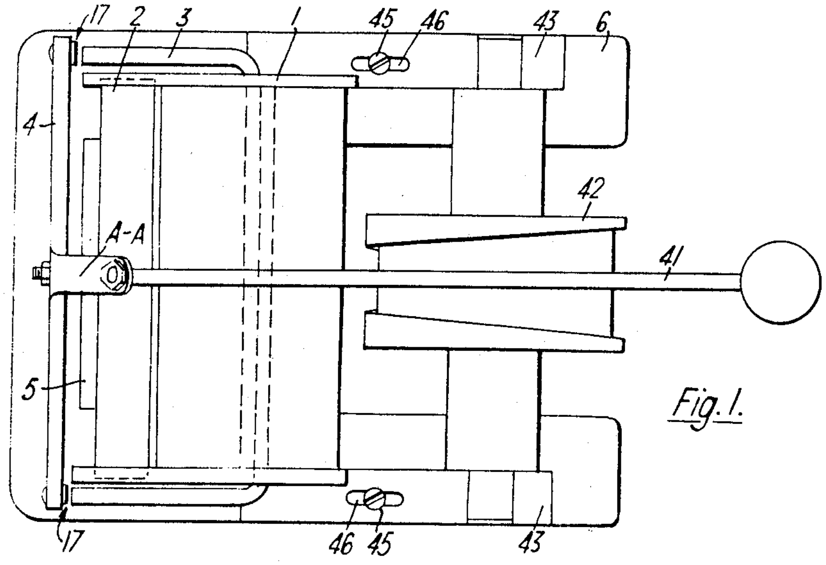
FIG. 1 shows a plan view of a ringer according to the invention.
Figure 2:
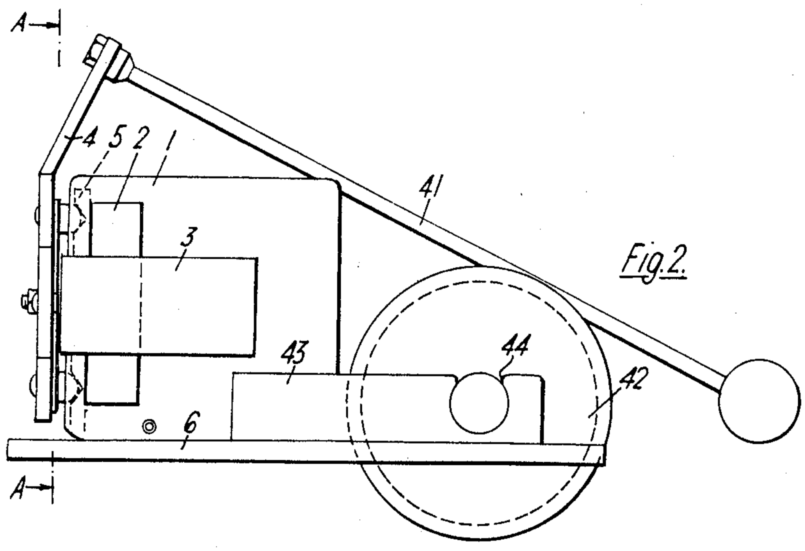
FIG. 2 shows a side view of the ringer shown in FIG. 1.
Figures 3, 4, 5, 6:
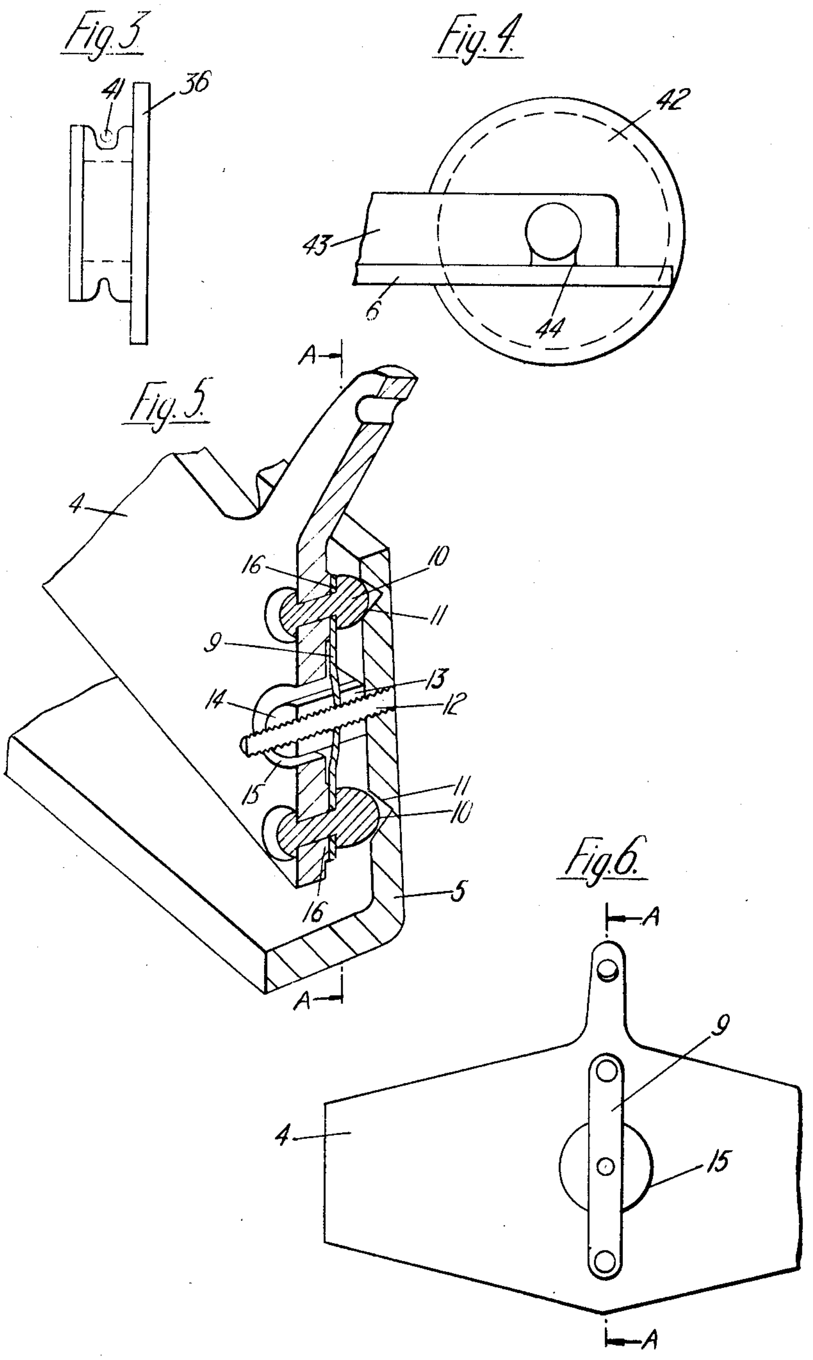
FIG. 3 shows an alternative form of control wheel for the ringer.
FIG. 4 shows an alternative mounting for the control wheel of the ringer.
Figure 10:
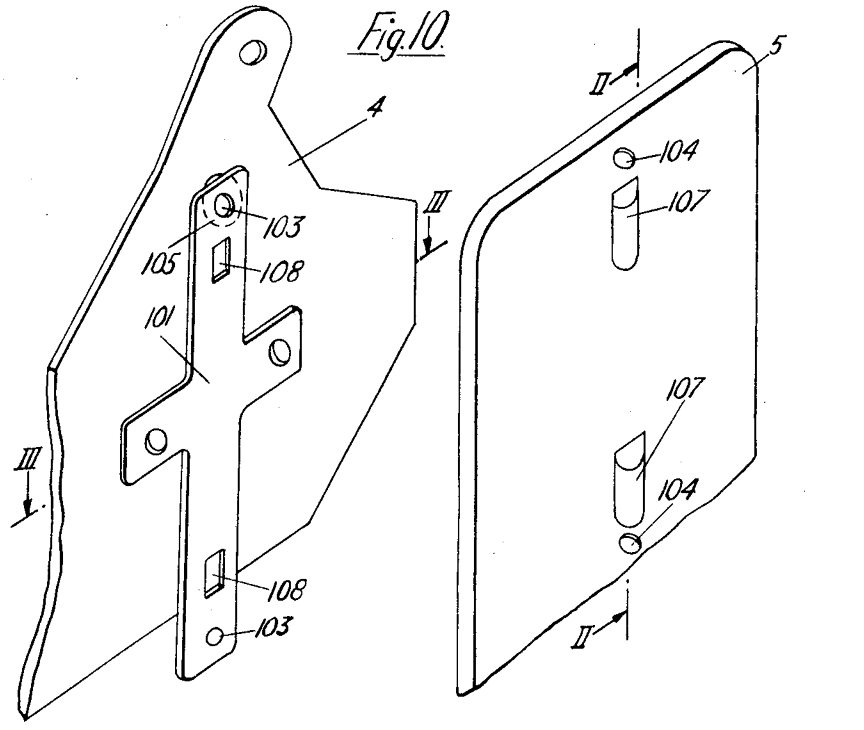
Figure 11:
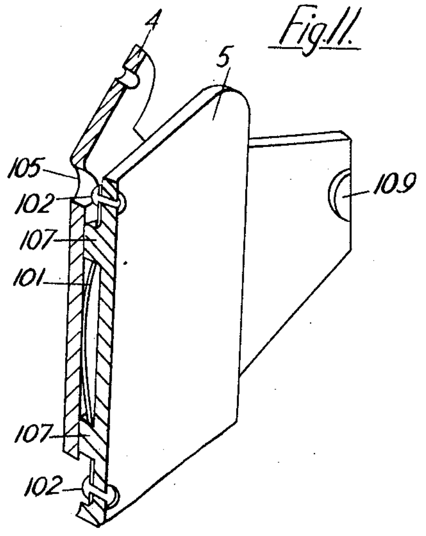
Figure 7:
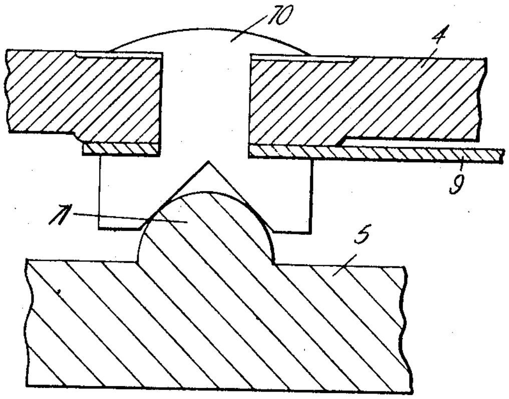
Figures 8, 8A:
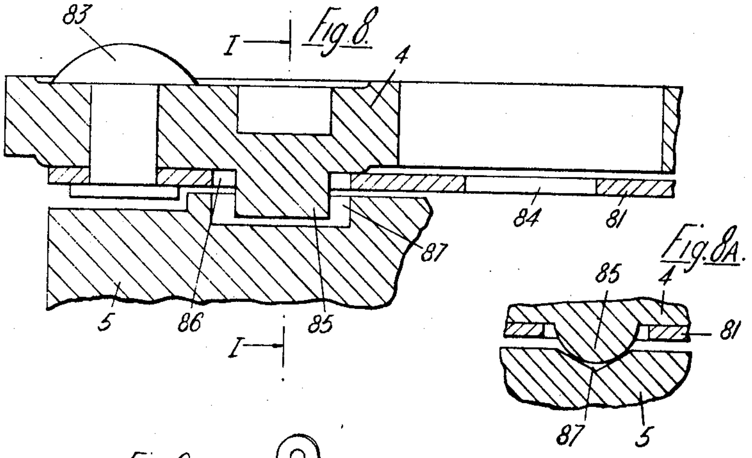
Figure 9:
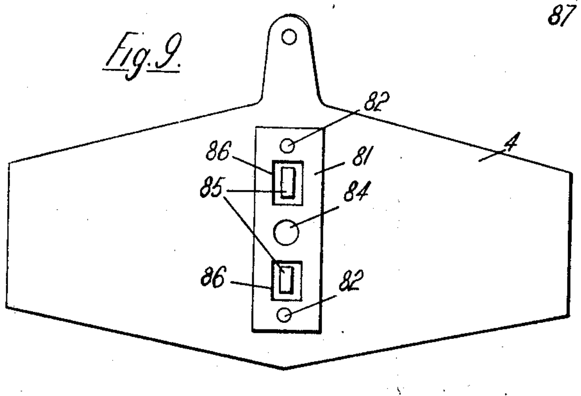
Figure 12:
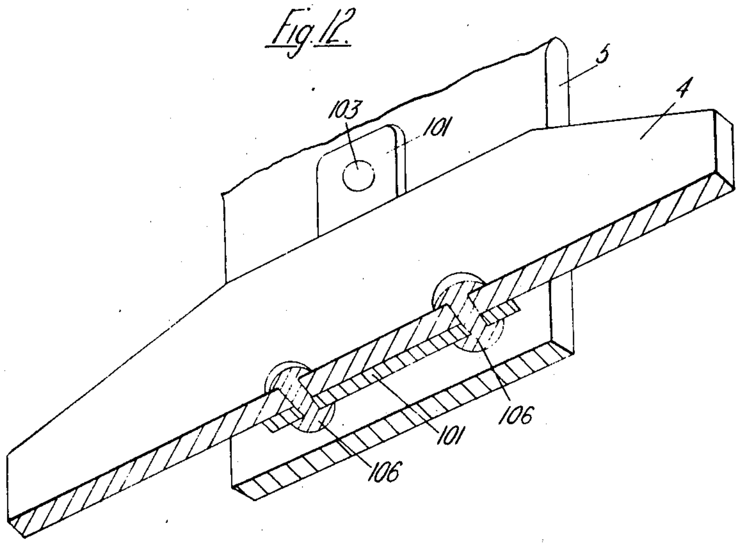
Figure 13:
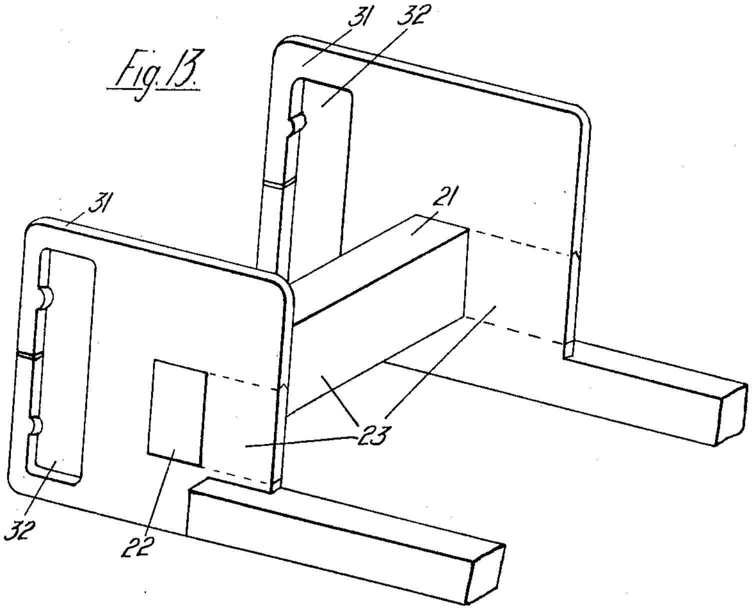
Figures 14, 15A, 15B, 15C:
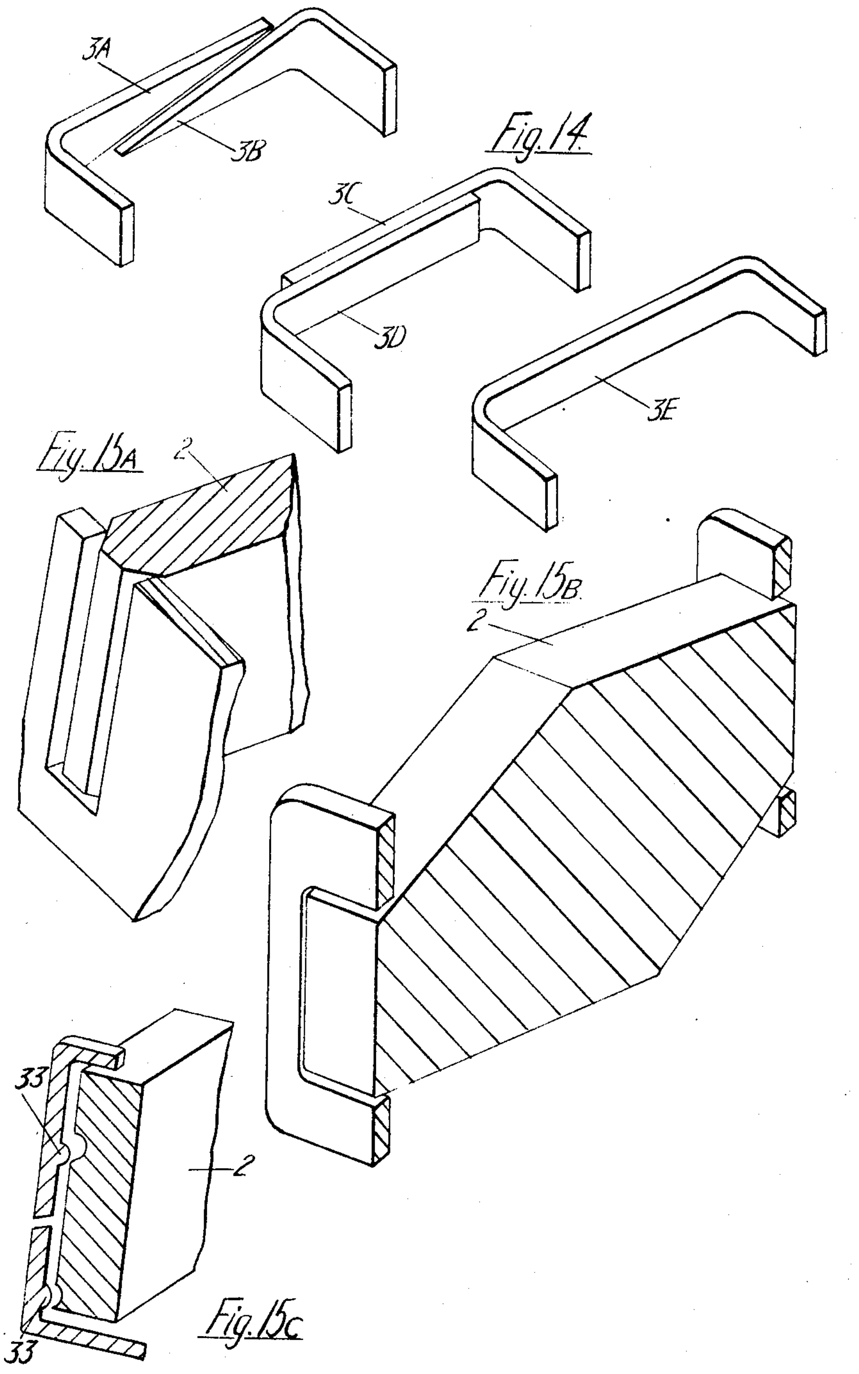
Figure 16:
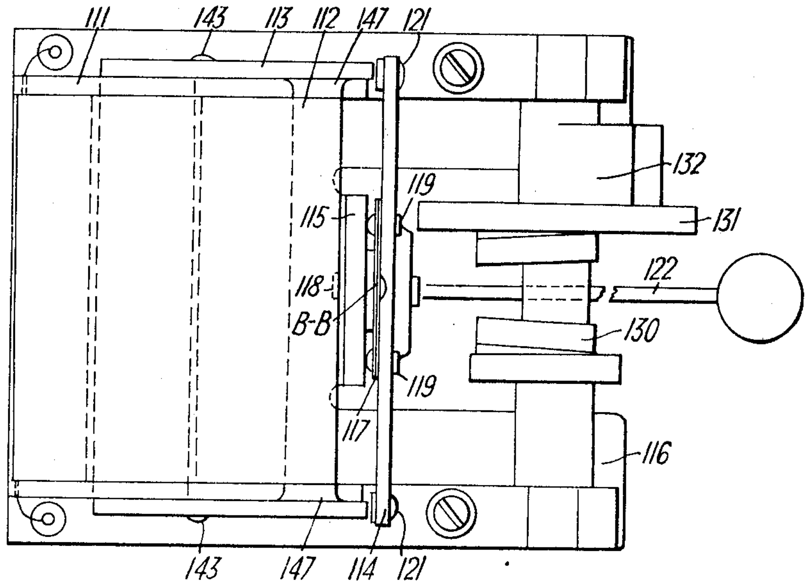
Figure 17:
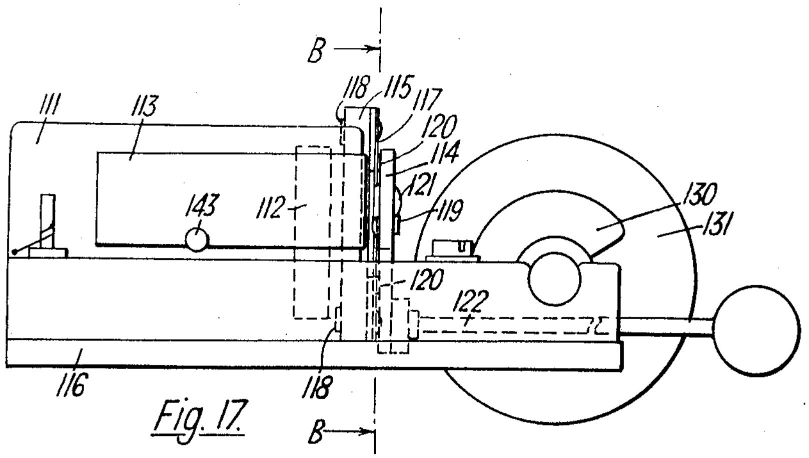
Figure 18:
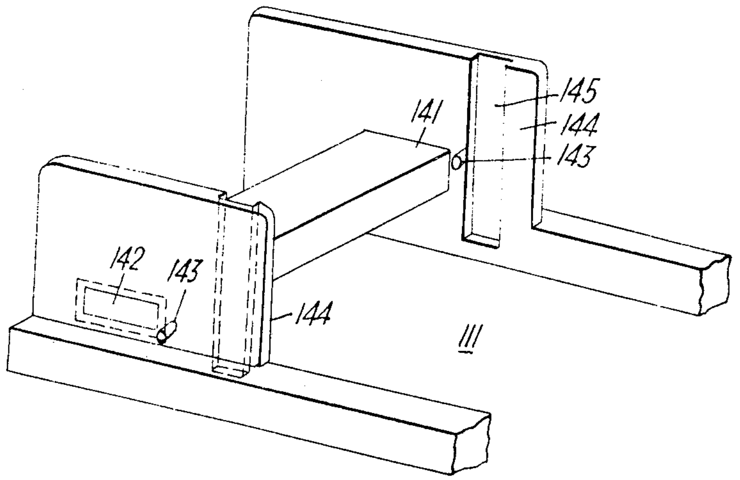
Figure 19:
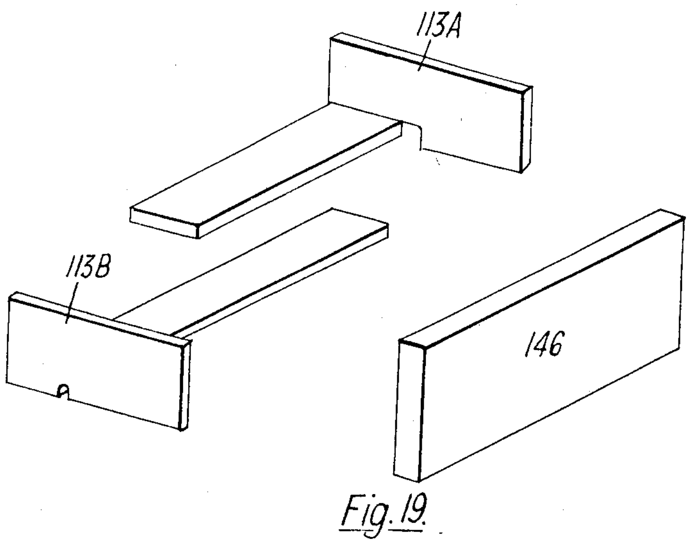

FIG. 5 shows a cross-sectional and perspective view of the armature pivot of the ringer shown in FIGS. 1 and 2, FIG. 6 shows a side view of the armature, showing up a point of detail of FIG. 5, FIG. 7 is a cross-sectional view showing an alternative form of armature pivot to that shown in FIGS. 1, 2 and 5, FIG. 8 is a cross-sectional view showing a further alternative form of armature pivot according to the invention, FIG. 8A is a part section along the line I—I through FIG. 8, FIG. 9 shows a similar side view to FIG. 6, of the armature shown in FIGS. 8 and 8A, FIG. 10 shows an exploded perspective view of a further alternative of the armature pivot, FIG. 11 shows a cross-sectional view along the line II—II of the assembled armature pivot shown in FIG. 10, FIG. 12 shows a cross-sectional view along the line III—III of the assembled pivot shown in FIG. 10, FIG. 13 shows a perspective view of part of the coil-carrying spool of the ringer shown in FIGS. 1 and 2, FIG. 14 shows alternative embodiments of the U-shaped magnetisable core of the ringer shown in FIGS. 1 and 2, and FIGS. 15A, 15B and 15C illustrate various ways in which extensions of the spool shown in FIG. 13 can hold the permanent magnet of the ringer, FIG. 16 shows a plan view of another ringer according to the invention, FIG. 17 shows a side view of the ringer shown in FIG. 16, FIG. 18 shows a perspective view of part of the coil-carrying spool of the ringer shown in FIGS. 16 and 17, and FIG. 19 shows the magnetisable core and the permanent magnet of the ringer shown in FIGS. 16 and 17.

Referring first to FIGS. 1 and 2, the ringer includes a coil-carrying spool 1, extensions of which also carry a ferrite permanent magnet 2, polarised to have one longitudinal face a north pole and the other longitudinal face a south pole. There is also a soft iron magnetisable core 3 extending through an axial hole in the spool 1. An armature 4 is rockable about a pivot axis A—A midway between its ends, and is held on a support 5 provided by an upstanding portion of a base plate 6.

Referring now to FIGS. 5 and 6, the support 5 has a flat surface parallel to the flat armature 4. The armature 4 is held to the support 5 by means of an elongated flat spring 9 which has its length parallel to and is equally disposed on either side of the pivotal axis A—A. The ends of the spring 9 are held to the armature 4 by two dome-ended rivets 10. The dome-end of each rivet 10 fits into a conical recess or trough 11 in the support 5, and these two rivets define the pivotal axis A—A. The spring 9 is held at its middle by means of a post 12 screwed into the support 5. The post 12 extends through a collar 13 resting on the support 5, through a hole in the centre of the spring 9, and through a nut 14 which is located in a hole 15 in the armature 4. The nut 14 is tightened to bow the spring 9 until it bottoms on the collar 13. The tensioning nut 14 may be secured by a lock nut or by the application of a suitable sealant. Shims or washers 16 hold the spring 9 away from the armature 4 and ensure better defined fastening points than would be given merely by the bowing of the spring 9 away from a flat armature 4.

The tension in the spring 9 due to bowing holds the armature firmly to the support 5 by the spring forcing the rivets 10 into the recesses 11. This automatically takes up any slack left in the assembly, and subsequently, any slack due to wear. The pivotal axis A—A is defined by the line joining the centres of curvature of the domed rivet heads. Ideally, to reduce hammering of the rivet heads in the recesses 11 and consequent wear of the bearings, this line should pass through the plane containing the axis of torsion of the spring 9. This is approximately achieved by the construction as shown in FIG. 5. A good pivotal action is thus always ensured. The spring 9 also provides a mechanical stiffness to counteract the difference in magnetic pulls existing at the ends of the core 3 when the armature is off balance, thus rendering the system very sensitive to small A.C. electrical inputs.

The rivets 10 could be made of metal or of a plastics material and could actually be screws instead of rivets. Considering plastics rivets, they could be dome-headed, the other end of the rivet being spun over or heat sealed to provide secureness of fixing; alternatively, the head of the plastics rivet could be that portion in contact with the armature 4, the dome-end being formed after insertion of rivet by a spinning or other operation.

FIG. 7 illustrates an alternative form of armature pivot. Instead of a dome-ended rivet fitting into a recess in the support, there is shown a slotted rivet 70, in which fits a raised semi-cylinder or hemisphere 71 on the support 5.

It is not essential that the rivets which hold the spring 9 to the armature 4 also provide the pivoting action. The spring 9 could be held to the armature 4 at its ends by rivets or by welding or staking or by throwing up excrescences on the armature and heading them over the spring. The pivoting action could then be provided in a number of ways at points along the pivotal axis. It could be by further dome-headed rivets as described above, or by ball bearings or rollers held captive in recesses in the armature and the support, or by excrescences on the inside of the armature which engage with indentations on the support or vice-versa. As will be seen from the embodiment later to be described with reference to FIGS. 10 to 12 it is also possible to have excrescences bearing on a flat surface.

Considering again the holding together of the armature 4 and the support 5, the spring 9 could alternatively be held at its middle to the armature 4 and at its ends to the support 5.

FIGS. 8, 8A and 9 show an alternative form of spring, method of fixing the spring, and pivoting to that shown in FIGS. 1, 2, 5 and 6. A rectangular flat spring 81 has two holes 82 through which project rivets 83 to hold the spring 81 to the armature 4 at its ends. A central hole 84 in the spring 81 is for the purpose of accommodating a post so that the spring 81 is held to the support 5 at its centre in the same manner as the embodiment described with reference to FIGS. 5 and 6. The pivoting is provided by two semi-cylinders 85, thrown out of the armature 4, projecting through rectangular holes 86 in the spring 81 and nestling in two troughs 87 of triangular cross-section in the support 5. Alternatively, semi-cylinders could be thrown upon the support and project through the spring to nestle in troughs in the armature.

FIGS. 10, 11 and 12 show a further alternative form of armature pivot. The spring 101 is of a flat cruciform shape. It is held to the support 5 at the ends of its arms which run parallel to the pivotal axis by rivets 102 which project through holes 103 in the spring 101 and corresponding holes 104 in the support 5. A hole 105 is provided in the armature 5 to give access to one of the rivets 102 for heading over. The other two arms of the spring 101 are held to the armature 4 by rivets 106 (see FIG. 12). Two semi-cylindrical fulcra 107 are raised on the support 5 and project through rectangular holes 108 in the spring 101. By this construction, the armature is positioned securely without the use of indents or troughs. Also, the plane of the spring and the pivotal axis are very nearly co-planar; this important feature is not so well achieved if the fulcra are raised on the armature.

The arms of the spring lying along the armature in the general direction of magnetic fluxes are shown to be short, it is however possible for these to extend to the ends of the armature to provide a non-freezing device with a spring of non-magnetic material such as beryllium copper. FIGS. 11 and 12 show other alternative non-freezing devices. FIG. 11 shows one of two non-freezing studs 109 on one end of the armature 4. FIG. 12 illustrates how the securing rivets 106 could be dome-headed and used as non-freezing studs by contacting the support 5 as the armature rocks to one side.

Referring now back to FIG. 1, this shows that the magnetisable core 3 is U-shaped with the part of the core within the coil forming the base of the U and the ends of the core projecting from the coil turned at right-angles to form the legs of the U. The armature 4 is straight and is parallel to the axis of the coil with its ends cooperating with the end faces of the core 3, with air gaps 17.

Referring now to FIGS. 13 and 14, the spool 1 is made of a resilient plastics material and its axial core 21 has a hole 22 running through it. The U-shaped core 3 can be made up by two L-shaped cores with one arm of each core projecting outside the coil and the other arm extending into the spool 1. The arms of the L-shaped cores inside the coil can be wedge shaped 3A, 3B and fit on top of each other to give a single thickness to the core inside the spool. Alternatively, these arms can be full-width 3C, 3D and lie beside each other to give a double thickness to the core inside the spool. The purpose of having the wedge shaped cores or cores giving double thickness is that they give a small air gap reluctance than if a U-shaped core was simply split in two.

It is also possible to have the U-shaped core in a single piece 3E. In this case the spool will have a removable portion which takes away one side of the core of the spool to allow insertion of the U-shaped core. FIG. 13 shows that this removable portion could be a U-shaped member 23 having a sliding fit in the body of the spool.

FIG. 13 shows that the cheeks of the spool 1 have extensions 31 with slots 32. The permanent magnet 2 has its length parallel to the axis of the coil and is held by its ends snap fitting into the slots 32 in the spool cheek extensions 31. FIG. 15 illustrates three ways of achieving this snap fit. FIGS 15A and 15B show two examples of how the ends of the permanent magnet can be chamfered so as to wedge into the spool cheek slots. FIG. 15C shows the spool cheek extensions having integral knobs 33 extending into the slots. The knobs engage corresponding dimples in the permanent magnet.

Referring again to FIGURES 1 and 2 a hammer 41 is carried by the armature 4, and when the armature rocks, the head of the hammer strikes two gongs (not shown) one on each side of the hammer head.

The volume of sound emitted by the hammer head striking the gongs can be controlled by a wheel 42 mounted beneath the hammer so that the arm of the hammer floats in a channel around the circumference of the wheel. This channel has a variable width, as shown in FIG. 1, and rotation of the wheel causes the walls of the channel to converge or diverge from the arm, controlling the distance the arm of the hammer can move sideways, and hence the force with which it hits the gongs. The arm of the hammer is, of course, flexible. Alternatively, the channel can have a constant width and be overlayed by a tyre, e.g. of foam rubber which has a channel of variable width.

In an alternative form of volume control wheel, the wheel is an eccentric and its circumferential channel is lined with a damping material such as a foam rubber or plastics material. Rotation of the wheel when mounted beneath the arm of the hammer causes the foam rubber lining mentioned above to bear on the arm. This exerts a damping action on the arm, lessening the force with which the head of the hammer strikes the gongs.

FIG. 3 shows another form of control wheel. One cheek 36 is longer than the other, and only this cheek extends through the base. The user only needs one cheek to adjust the wheel.

In FIGS. 1 and 2 the volume control wheel is shown axially supported between two upright extensions 43 of the spool 1. The control wheel 42 with an integral axle is pressed into the cylindrical recesses or bearings 44. The walls of the bearings move apart allowing entry and finally snap inwards, partially embracing and securing the axle. During adjustment of the volume control wheel an upward force is exerted on the axle which tends to push it out of its bearings. The axle remains secured, however, as the spool 1 is screwed firmly to the base plate, thus preventing the walls from flexing outwards. FIG. 4 shows an alternative way of mounting the control wheel.

FIG. 1 shows that the spool unit 1 is secured to the base plate 6 by two screws 45 which enter slots 46 at the sides of the spool cheeks and engage in two threaded holes in the base plate. Adjustment of the airgaps is made by slackening off these screws and sliding the spool together with the magnet and core towards or away from the armature.

When the coil is energized by an alternating current, the core 3 and armature 4, carrying the D.C. magnetic flux due to the permanent magnet 2, are further magnetised and this magnetisation direction is reversed every half cycle. Thus, during any one half cycle there exists at one gap a greater flux density and therefore, a greater pull than at the other gap and the armature is caused to rock about its pivots in a plane perpendicular to the axis through the pivots. The condition is reversed during the next half cycle and the armature rocks over in the opposite direction.

FIGS. 16 and 17 show another example of a complete ringer, as an alternative to that shown in FIGS. 1 and 2. The ringer includes a coil-carrying spool 111, extensions of which also carry a permanent magnet 112. A soft iron magnetisable core 113 extends through an axial hole in the spool 111. An armature 114 is rockable about a pivotal axis B—B midway between its ends, and is held on a support 115 provided by an upstanding portion of a base plate 116.

The support 115 has a flat surface parallel to the flat armature 114. The armature 114 is held to the support 115 by means of a spring 117 of flat cruciform shape similar to that shown in FIG. 10. The spring 117 is held to the support 115 at the ends of its arms which run parallel to the pivotal axis by rivets 118. The other two arms of the spring 117 are held to the armature by rivets 119. Two semi-cylindrical fulcra 120 are raised on the support 115 and project through rectangular holes in the spring 117 and bear on the flat surface of the armature 114. Two rivets 121, one on each end of the armature 114 are provided as non-freezing studs.

A hammer 122 is carried by the armature 114. The arrangement of the hammer 122 is that it projects from the lower end of the armature 114 and away from the spool 111. This arrangement reduces the overall height of the ringer compared with the arrangement shown in FIGS. 1 and 2 where the hammer projects from the top end of the armature and over the spool. A control wheel 130 is mounted above the hammer 122 so that the arm of the hammer floats in a variable width channel around the circumference of the wheel. One cheek 131 of the wheel 130 is longer than the other and only this cheek extends through the base 116 to enable the user to rotate the wheel. A sector-shaped portion 132 adjacent to the cheek 131 moves with the control wheel as it is rotated in either direction. The sector 132 will finally contact the base plate 116 to prevent further rotation and so it sets the positions of maximum and minimum sound output.

Referring now to FIGS. 18 and 19, the spool 111 is made of a resilient plastics material and its axial core 141 has a hole 142 running through it. The U-shaped core 113 is made up by two L-shaped cores 113A and 113B. These cores are secured inside the spool by ironing over two pillars 143 at the spool cheek ends (see also FIGS. 16 and 17). The spool cheeks have extensions 144, outside the winding of the coil, with channels 145. The permanent magnet 146 has its length parallel to the axis of the coil and its width is a little less than the height of the channels 145. It is held by slipping it into the channels 145 and then heat sealing it into position by ironing over on to the magnet the thinned down portions of the spool cheeks, which form the unoccupied portions of the channels 145. The ironed-over portions 147 are shown on FIG. 16. This fixing arrangement allows wider tolerances on the magnet and spool than is the case with the snap fit arrangements shown in FIG. 15 and both magnet and spool are simpler shapes.

What we claim is:

1. A pivoted armature magnetic device comprising coil means,
   core means associated with said coil means,
   said armature having its pivotal axis centrally disposed and perpendicular to the general direction of magnetic fluxes in the armature,
   support means for said armature,
   said pivotal axis comprising pivot points of cooperation between said armature and said support means,
   flat spring means, and means for attaching said spring means to said armature, means for attaching said spring means to said support means,
   said spring means being bowed so that the tension in the spring means applies a force coaxial with said pivotal points that holds the armature and the support means firmly together to insure good pivotal action.

2. A polarized magnetic ringer comprising a magnetizable core surrounded by energizing coil means,
   end portions of the core projecting out of the coil,
   an armature substantially parallel to the core and rockable about a centrally disposed pivotal axis,
   said pivotal axis being perpendicular to the general direction of magnetic fluxes in the armature,
   support means for said armature,
   pivotal points between said armature and said support means,
   flat spring means, means for attaching said spring means to said armature, means for attaching said spring means to said support means,
   said spring means being bowed so that the tension in the spring means applies a force coaxial with said pivotal points that holds the pivotal points between the armature and the support means firmly together with the end portions of the armature positioned to cooperate with end portions of the core,
   magnetic means for causing the ends of the core to have the same magnetic polarity,
   whereby that energization of the coil with alternating current causes the armature to rock about the pivotal axis, and a hammer carried by the armature to cooperate with at least one gong adjacent to the head of the hammer for providing ringing.

3. The ringer of claim 2, wherein the energizing coil comprises a spool made of a resilient plastics material, wherein the magnetizable core is contained in an axial hole through the spool, wherein the magnetic means is a permanent magnet having its length parallel to the axis of the coil, and wherein the spool comprises extended spool cheeks that extend beyond the winding of the coils to hold said permanent magnet in the extended cheeks.

4. The ringer of claim 3 wherein slots are provided in said extended cheeks whereby the permanent magnet snap fits into the slots.

5. The ringer as claimed in claim 3, wherein the permanent magnet fits in channels in the extended cheeks and is secured by portions of the plastics material being heat-sealed over it.

6. The ringer of claim 3, wherein the magnetizable core is U-shaped with the part of the core within the coil forming the base of the U and the ends of the core projecting from the coil turned at right-angles to form the legs of the U, and wherein the armature is substantially straight and is parallel to the base of the U with its ends cooperating with the ends of the core.

7. The ringer or a device as claimed in claim 6, wherein the U-shaped core comprises two L-shaped cores, one arm of each of said L-shaped cores projecting outside the coil and the other arm extending into the axial hole in the spool.

8. The ringer of claim 3, including a control wheel mounted near the arm of the hammer, the axis of the said wheel being substantially parallel to the plane of motion of the hammer arm, said control wheel comprising volume control means for limiting the movement of the hammer, and said control wheel being rotatable to adjust the limiting effect on the hammer and hence the volume of sound emitted.

9. The ringer of claim 8 wherein said volume control means comprises a circumferential channel of variable width in which the hammer arm floats, and wherein the rotation of the wheel causes the walls of the channel to converge on or diverge from the arm, whereby the distance travelled by the hammer and hence the force with which it strikes the at least one gong is controlled.

10. The ringer of claim 9 wherein said control wheel is eccentric, wherein said circumferential channel is lined with a damping material, whereby rotation of the wheel causes the lining to bear on the hammer arm applying a frictional force thereto which limits the movement of the hammer and reduces the force with which the hammer strikes the at least one gong.

11. The ringer of claim 10 wherein the cheek of the control wheel on one side of the circumferential channel is larger than the other, and wherein the wheel is mounted so that it is rotatable by pushing the circumference of the larger cheek.

12. The ringer of claim 9 wherein the control wheel further comprises an axle, and wherein a plastics moulding is provided on each side of said wheel having holes therein for receiving the ends of said axle.

13. The ringer of claim 12 wherein the moulding is resilient and the holes to receive the axle ends have open gaps so that the axle can be pressed into the holes.

14. The ringer of claim 13 wherein the spring means is a strip with its length parallel to the pivotal axis of the armature and is equally disposed on either side of the pivotal axis, said pivot points including means for holding the two ends of the spring means to the armature, and the middle of the spring means being bowed towards and held to the support means.

15. The ringer of claim 14, wherein the means for holding the two ends of the spring means comprises two dome-ended rivets, and recess means in said support means for receiving the dome head of each of said rivets, the two rivets thereby defining the pivotal axis.

16. The ringer of claim 13 wherein a pair of rivets is provided for holding the two ends of the spring means to said armature, and wherein said pivot points comprise two ridges, recess means in said support means for receiving said ridges, and means in said spring means to enable said ridges to project therefrom.

17. The ringer of claim 15 wherein post means are provided for holding said spring means, said post means being threaded and screwed into the support means, a collar means resting on the support means, said collar means having a hole therethrough to enable said post to extend therethrough, and a nut located in a hole in the armature to receive said threaded post, whereby the spring is bowed and urged against the collar in the tightened position of the nut.

18. The ringer of claim 13, wherein said spring means has a flat cruciform shape, wherein the spring means is held to the support means at the ends of one pair of arms which run parallel to the pivotal axis, and is held to the armature by the other pair of arms which run in the general direction of magnetic fluxes through the armature.

19. The ringer of claim 18 in which the pivotal axis is defined by two ridges on the armature which each project through a hole in the spring means and rest on a flat surface of the support means.

20. A polarized magnetic ringer, comprising a spool of a resilient plastics material, said spool carrying a coil which when in use is energized by an alternating current, a magnetizable core contained in an axial hole through the spool, said core having portions projecting out of the coil, a permanent magnet arranged to give the ends of the core the same polarity, the permanent magnet having its magnetic axis perpendicular to the axis of the coil, means for holding said magnet by its ends fitting into two extensions of the spool cheeks outside the winding of the coil, an armature which is substantially parallel to the core, said armature having end portions which cooperate with end portions of the core, said armature rockable about a centrally disposed pivotal axis, the pivotal axis being perpendicular to the general direction of magnetic fluxes in the armature and a support and comprising means extending from armature to abut receiver means on said support, a spring of flat cruciform shape which holds the armature to the support, a first pair of arms on the spring for attaching said spring to the support, said first pair of arms extending parallel to the pivotal axis, a second pair of arms which run in the general direction of magnetic fluxes through the armature for attaching said spring to said armature, so that the spring is bowed towards the armature and the tension in the spring due to bowing holds the armature and the support firmly together, a hammer carried by the armature and extending from the armature in a direction away from the spool, at least one gong adjacent to the head of the hammer, a control wheel mounted near the arm of the hammer, the axis of the said wheel being substantially parallel to the plane of motion of the hammer arm, said control wheel comprising means for limiting the movement of the hammer, and said control wheel being rotatable by pushing its circumference to adjust the limiting effect on the hammer and hence the volume of sound emitted.

References Cited

UNITED STATES PATENTS

| | | | |
|---|---|---|---|
| 547,035 | 10/1895 | Russell | 340—392 |
| 935,792 | 10/1909 | Jensen | 340—392 |
| 2,872,672 | 2/1959 | Lucas | 340—392 |
| 1,664,107 | 3/1928 | Hendry | 340—392 |
| 1,674,245 | 6/1928 | Gaynor et al. | 340—392 |
| 2,928,028 | 3/1960 | Persson | 340—392 |

HAROLD I. PITTS, Primary Examiner

U.S. Cl. X.R.

310—29; 340—400, 401, 402